P. F. JOHNSON.
ADJUSTING MEANS FOR THERMOSTATS AND THE LIKE.
APPLICATION FILED FEB. 19, 1915.
1,139,185.
Patented May 11, 1915.
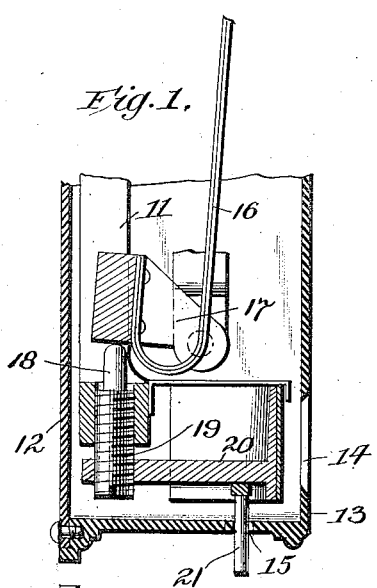
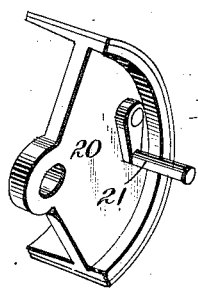
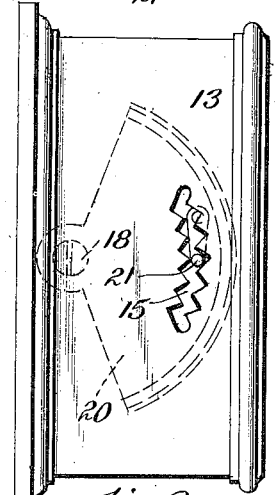
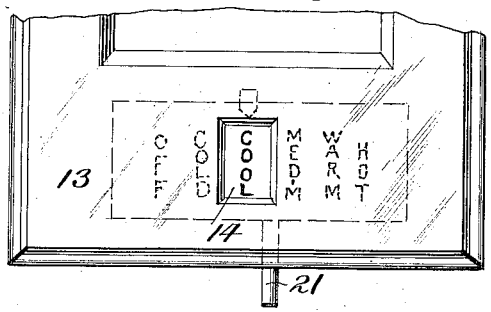
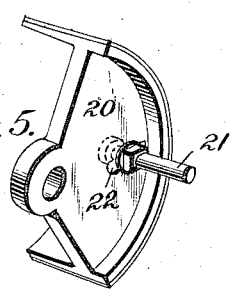
Inventor
Paul F. Johnson,

UNITED STATES PATENT OFFICE.

PAUL F. JOHNSON, OF MILWAUKEE, WISCONSIN.

ADJUSTING MEANS FOR THERMOSTATS AND THE LIKE.

1,139,185.   Specification of Letters Patent.   Patented May 11, 1915.

Application filed February 19, 1915. Serial No. 9,345.

*To all whom it may concern:*

Be it known that I, PAUL F. JOHNSON, a citizen of the United States, residing at Milwaukee, in the county of Milwaukee and State of Wisconsin, have invented certain new and useful Improvements in Adjusting Means for Thermostats and the like, of which the following is a specification.

This invention relates to automatic control devices such as thermostats hygrostats and the like, and resides in an improved means for adjusting the responsive element, for example the thermostatic bar, to determine the temperature at which it operates. Difficulty has been experienced with devices of the above character, for the reason that such devices must be subject to adjustment by unskilled persons who frequently cause damage by sudden and extreme changes of adjustment. Furthermore the needless wear on the adjusting parts destroys the precision of the device and causes the adjusting parts to move with undue freedom. The present invention, without imposing any limitations on the adjustment secured, renders sudden extreme adjustment impossible, and to a large extent removes the temptation to meddle with the adjusting device.

I illustrate the invention as applied to a thermostat of the type shown in the patent to C. F. Johnson, No. 1,109,993, September 8, 1914, in the accompanying drawings, in which:—

Figure 1 is a vertical axial section of the lower part of the thermostat and case; Fig. 2 is a view looking upward at the lower end of the same; Fig. 3 is a perspective view of the dial and adjusting handle; Fig. 4 is a front elevation of the lower portion of the cased thermostat, and Fig. 5 is a view similar to Fig. 3 showing a modification.

The main frame of the thermostat is indicated at 11 and to this is connected the wall plate 12 by any suitable means (not shown). To the wall plate 12 is attached the thermostat casing or cover 13 having an indicator dial aperture 14 in its front face and a zigzag arcuate handle-guiding slot 15 in its lower face.

For reasons set forth in the patent above-identified, the thermostatic bar 16 is mounted on a pivoted weighted saddle 17 whose downward movement is limited by an adjustable screw stop 18 which is threaded at 19 in the frame 11. By adjusting the stop 18 the action of the thermostat may be varied, and this adjustment is effected by turning the screw through an arc shaped dial 20 which is readable through the aperture 14 and which is fast on the screw stop 18. The only accessible means for turning dial 20 is a small offset crank arm 21 pivoted on dial 20 and extending outward through the zigzag slot 15. The purpose of pivoting the arm 21 is to allow it to move in an approximately radial direction to follow the slot 15 which closely confines and guides it. As an alternative construction I may mount the arm 21 in a substantially radial slot 22 the slot 22 permitting the arm to follow slot 15. (See Fig. 5).

With either arrangement it is necessary to move arm 21 back and forth alternately to move the dial and stop. This precludes rapid movements and because it is a rather tedious operation reduces the temptation to tamper with the device.

The invention is applicable to hygrostats and other types of thermostats and resides essentially in means for providing an irregular or interrupted path for the adjusting handle for the purpose set forth.

I use the term "automatic control device" as a descriptive term to include thermostats, hygrostats and the like, and the term "responsive element" to include any element responsive to changes in atmospheric condition.

Having thus described my invention, what I claim is:—

1. In an automatic control device the combination of a responsive element; a movable member for adjusting the action of said responsive element; a handle for moving said member and mounted to move thereon in a path transverse to the adjusting movement of said member; and a tortuous guide for said handle.

2. In an automatic control device, the combination of a pivoted saddle; a responsive element mounted thereon; a threaded stop for coacting with said saddle to adjust the action of said responsive element; a dial member fixed on said stop for turning the same and indicating the position thereof; a handle for moving said dial member and mounted to move thereon in a substantially radial path; and a tortuous guide for said handle.

In testimony whereof I have signed my name to this specification in the presence of two subscribing witnesses.

PAUL F. JOHNSON.

Witnesses:
F. M. ZEALLEY,
FRANCES COSKEY.